United States Patent

[11] 3,586,293

| [72] | Inventor | Walter Betta<br>Bergamo, Italy |
|---|---|---|
| [21] | Appl. No. | 711,452 |
| [22] | Filed | Mar. 7, 1968 |
| [45] | Patented | June 22, 1971 |
| [73] | Assignee | C. R. F. Officine Meccaniche Di Precisione S.p.A.<br>Milan, Italy |
| [32] | Priority | Sept. 29, 1964 |
| [33] | | Italy |
| [31] | | 51,788 |
| | | Continuation-in-part of application Ser. No. 491,358, Sept. 29, 1965, now Patent No. 3,381,938. |

[54] STRINGING OF CONDUCTORS
4 Claims, 6 Drawing Figs.

[52] U.S. Cl. ................................................. 254/134.3
[51] Int. Cl. ........................................................ E21c 29/16
[50] Field of Search ........................................... 254/134.3;
242/47.08, 47.09, 147, 155, 156

[56] References Cited
UNITED STATES PATENTS

| 3,232,558 | 2/1966 | Barkley | 254/134.3X |
| 3,381,938 | 5/1968 | Betta | 254/134.3 |

*Primary Examiner*—Robert C. Riordon
*Assistant Examiner*—David R. Melton
*Attorney*—Stevens, Davis, Miller & Mosher ABSTRACT: A device for balancing the tension in at least two conductors as they are fed out from feed drums comprising two braking drums each having at least one conductor passing thereover; a balanced hydraulic system having a pair of axles each connected to a corresponding drum; and a volumetric fluid pump connected to each axle. The fluid flow to each pump is controlled in order to brake the drums, and the fluid pressure is balanced by a balancing circuit in order to maintain equal tension in the conductors.

PATENTED JUN 22 1971

Inventor
Walter Betta
By Stevens, Davis, Miller & Mosher
Attorneys

Inventor
Walter Betta
By Stevens, Davis, Miller & Mosher
Attorneys

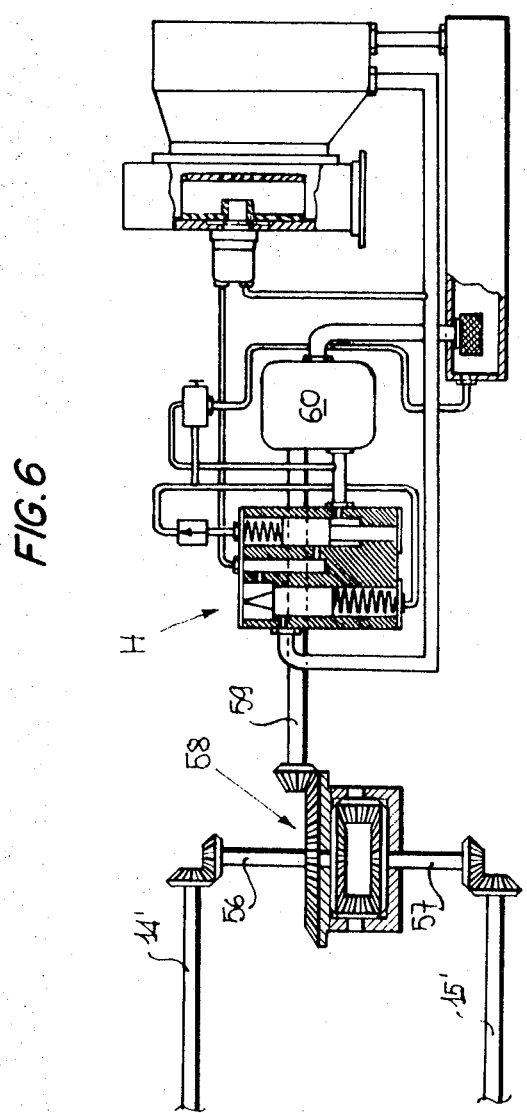

STRINGING OF CONDUCTORS

This application is a continuation-in-part application of my copending U.S. Pat. application Ser. No. 491,358, now U.S. Pat. No. 3,381,938 for "Improvements in the stringing of conductos."

This invention relates to the stringing of a bundle of conductors, comprising at least one couple of conductors, in a very high tension line. The most important problems involved in the simultaneous stringing operation of many conductors are:

1. that the tensions in the individual conductors of the bundle may be kept always equal to one another: this is in fact the condition that ensures that the distance of all the conductors from the ground is that which was intended by the designer;
2. that the element connecting the rope and the conductors may pass smoothly over the pulleys employed for stringing, causing as little increase in tension as possible during its passage.

An object of the invention is to provide a stringing apparatus which is apt to perform the stringing of two conductors with equilibrated tension between the conductors, said apparatus comprising two braking drums each having a conductor passing thereover in frictional engagement therewith, braking means for braking said drums and balancing means for controlling the braking force and equally braking said drums to maintain equal tension in said pair of cables.

A further object of the invention is to provide a stringing apparatus which is apt to perform the stringing of four conductors with equilibrated tension between the conductors, said apparatus comprising a balanced braking unit of the type described, having two braking drums and a pair of conductors passing over each drum in frictional engagement therewith, and connecting means for connecting a single drawing rope to said four cables, said connecting means comprising a body means connected to said drawing rope, two loops of rope each connected at their ends to two cables of the same pair, at least one pulley associated with each loop, each pulley being freely mounted for rotation on said body means and engaging its associated loop, said pulleys enabling, through the action of the associated loop, an equal stretch of each cable when said drawing rope is pulled away from said feed drum.

Other objects and structural details of the invention will be apparent from the following description when read in conjunction with the accompanying drawings, wherein:

FIG. 6 is a diagrammatic view of a different embodiment of the braking unit for controlling the apparatus of FIG. 1.

Figure 1:
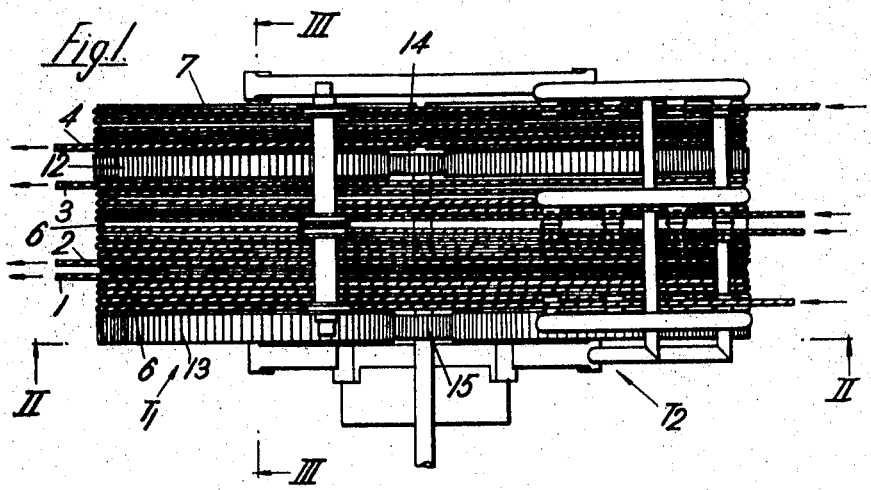
FIG. 1 is a plan view of the complex of braking apparatus.
Figure 2:
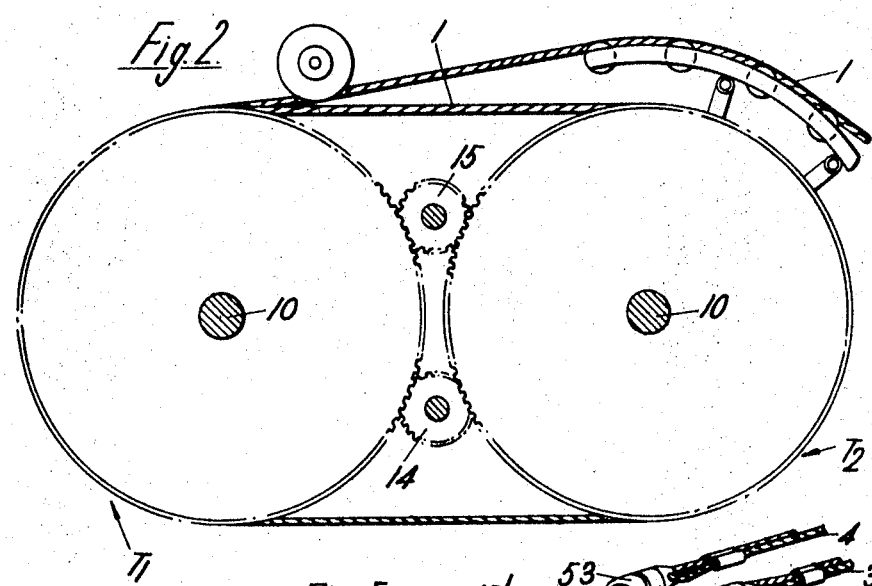
FIG. 2 is a section on the line II-II of FIG. 1.
Figure 3:
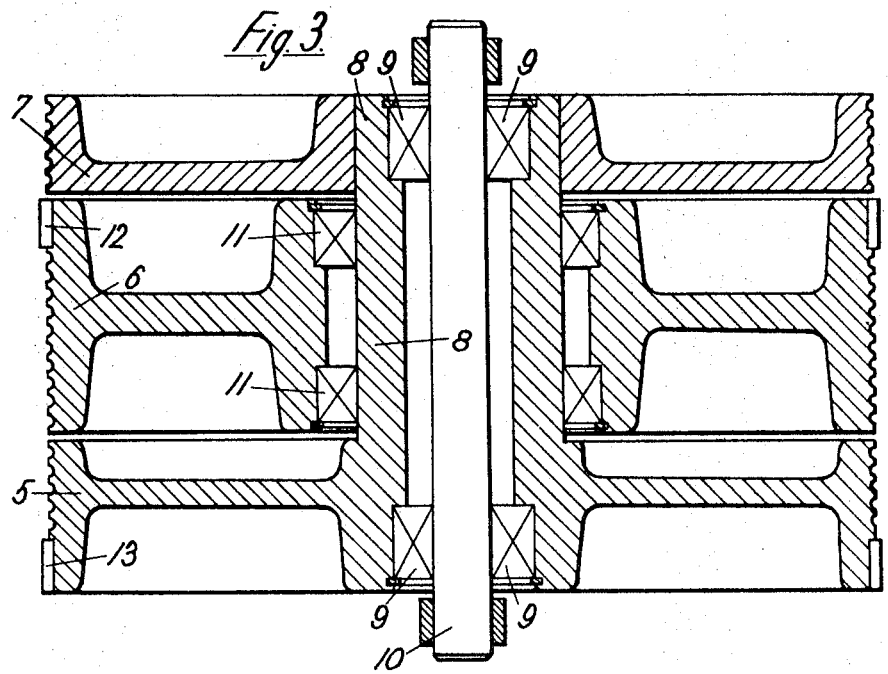
FIG. 3 is a section on the line III-III of FIG. 1.
Figure 4:
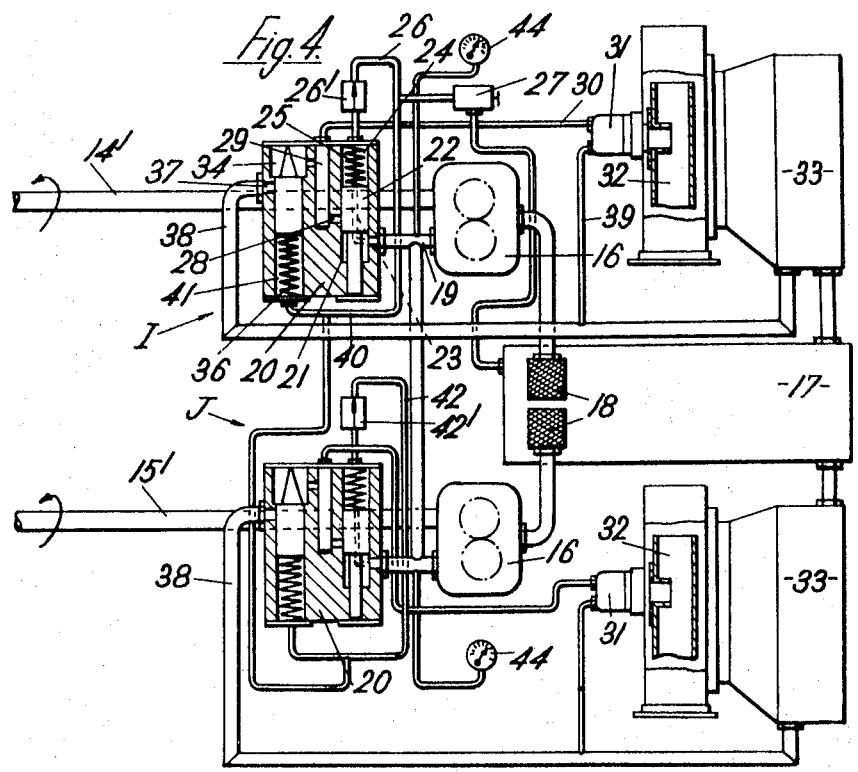
FIG. 4 is a diagrammatic view of the braking unit for controlling the apparatus of FIG. 1.

As shown in FIGS. 1 and 2, the braking apparatus for four conductors 1, 2, 3, 4 consists essentially of two groups of drums $T_1$ and $T_2$. Each group of drums is constituted, as shown in FIG. 3, by wheels 5, 6 and 7 of large diameter. The wheels 5 and 7 are solid with the hub 8 and can rotate freely via this hub and rolling bearings 9 on a supporting shaft 10. On the central part of the hub 8 the wheel 6 can rotate on bearings 11. The wheel 6 is provided on one side with a ring of teeth 12. A ring of teeth 13 is also associated with the wheel 5. By means of the rings of teeth 12 and 13 the rotation of the wheels 5—7 and 6 is transmitted respectively to pinions 14 and 15. The wheels 5—7 and 6 have on their peripheries grooves in which the cables 1, 2, 3 and 4 wind. More precisely the cable 1 winds in the groove of wheel 5, the cable 4 in the groove of wheel 7 and the cables 2 and 3 wind on the wheel 6, starting from its opposite ends. The shafts 14' and 15' of the group of FIG. 4 are solid respectively with the pinions 14 and 15. They control the hydrodynamic groups for controlling the braking, indicated respectively at I and J, which will be described below.

The shaft 14' actuates, when rotating, a reversible volumetric hydraulic pump 1 which supplies fluid, generally oil, from a reservoir 17 via a filter 18. This fluid is fed via a pipe 19 to the main control valve 20 under constant pressure. The fluid in the front chamber 21 of the piston 22 then traverses pipe 23 and passes to the rear chamber 24 in which is located a return spring 25. From this chamber the fluid passes via a pipe 26 and a nonreturn valve 26' to a pilot valve 27 for controlling the pressure of the valve 20.

When the piston 22 is in the forward position the fluid passes through the pipe 28 to chamber 29 from which it passes via a pipe 30 to actuate a hydraulic motor 31 for driving a blower 32. The latter serves to create a cooling current in the heat exchanger 33. The part of the fluid not fed to the motor 31 passes into chamber 34 and, pressing the piston 35 against the action of the spring 36, flows via the pipe 37 so as to pass through the piping 38 to the heat exchanger 33. To this latter is also fed, via piping 39, the output of the hydraulic motor 31. Piping 40 connects the chamber 24 to the chamber 41 that accommodates spring 36, so that these two chambers are maintained under the same pressure. Group J is wholly identical with group I just described and is also associated, via piping 42 with nonreturn valve 42', with the above mentioned pilot valve 27. In this manner, control of all the groups is effected by means of a single valve.

Directly at the outlet of both volumetric pumps 16 is connected a pipe 43 the purpose of which is to equalize the pressure in the two groups as will be described below. The pressures in the two groups are further indicated and controlled by means of manometers 44.

During operation, if the torques applied to the shafts 14' and 15' are equal, the two circuits operate in identical manner, as described, and the hydraulic pump 16, feeds part of the fluid to the motor 31 whilst part flow by via the passage 37 and is supplied to the heat exchanger 33. From here, the fluid passes to the reservoir 17 where it is again drawn by the pump 16.

When the pressures in the two circuits are identical the nonreturn valves 26' and 42' are open, and a certain quantity of fluid flows to the pilot valve 27, then passing to the output via the piping 27'. In the return piping 43 there is no flow of fluid, since the pressures at the ends thereof are equal.

In the event of unbalance occurring between the torques in the shafts 14' and 15', the hydraulic balancing circuit, formed by valve 42 and piping 43, immediately come into operation. Assuming for example that the greater torque is exerted on the shaft 14' due to a higher pressure in group I, the valve 42' closes the piping 42 whilst a certain quantity of fluid passes via the piping 43 from the group I to the group J. This condition persists until the same pressure as that in group I is established in group J, signifying that a torque equal to that exerted on shaft 14' is exerted on shaft 15'. In other words, it may be said that the fluid that passes through the piping 43, flowing in a direction opposite to the output of the pump 16 driven by shaft 15', tends to brake the shaft 15' and equalize the two torque values.

At the limit, given that the hydraulic pumps 16 are reversible, if the torque exerted on the shaft 15' becomes zero, the oil under pressure fed by the pump 16 controlled by the shaft 14' feeds via the piping 43 the pump 16 of the shaft 15' which operates as a hydraulic motor to transmit an opposite torque to the shaft 15'.

In this manner, therefore the torques exerted on the wheels 5—7 and 6 respectively, or the tensions on the pairs of cables 1—4 and 2—3 respectively are maintained constantly equal during the stringing operation.

A different embodiment of the braking unit hereabove described, is illustrated in FIG. 6. The two shafts 14' and 15', which are solid respectively with the pinions 14 and 15 of FIG. 2, are connected to the two output shafts 56 and 57 of a differential gear 58. The input shaft 59 of this differential unit actuates, when rotating, a reversible volumetric hydraulic pump 60. To the pump 60 is associated a hydraulic control group H, which is substantially the same as the group I or J of FIG. 4.

It will be noted, however, that this control group H does not provide those parts which relate to the hydraulic balancing circuit between group I and J; in this case, in fact, balancing operation between the torques in the shafts 14' and 15', that is between the stringing tensions on the pairs of cables 2—3 and respectively 1—4, is effected through the differential unit 58 which, in a known manner, equally distributes the braking force exerted on the shaft 59, between the shafts 56 and 57.

The braking unit illustrated in FIG. 6 is particularly useful, in respect to that of FIG. 4, when the stringing of four smaller or lighter conductors is effected, or in the case that the apparatus is used for the stringing of only two conductors. In this last case the first conductor is wound on the drum 6 and the second on the drum 5, without any modification in the braking apparatus.

Figure 5:
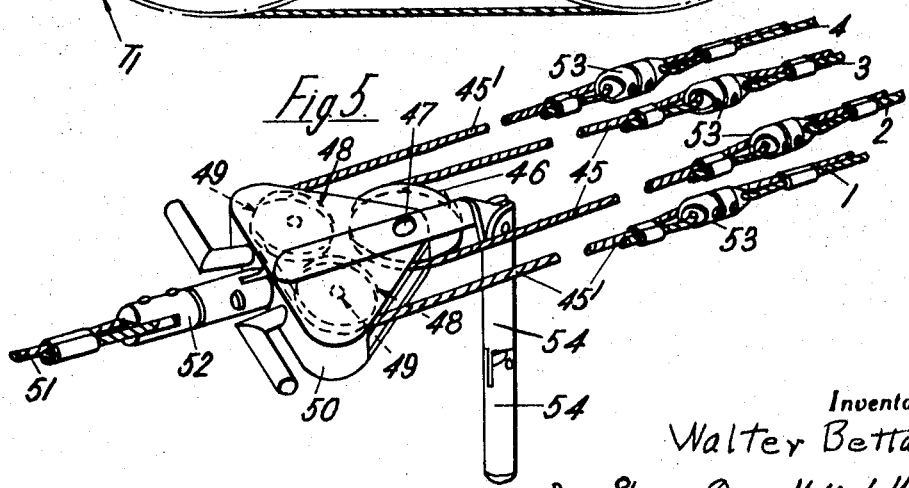
FIG. 5 is a perspective view of a connection group for four conductors.

In the stringing of four conductors, since there must of course be equilibrium between the tensions in the two cables 2 and 3 wound on the wheel 6 and the tensions in the two cables 1 and 4 wound on the wheels 5 and 7 respectively, there is provided for this purpose a particular type of connection between the drawing rope and these cables. This connection is clearly illustrated in FIG. 5, in which it can be seen that the cables 2 and 3 are connected to a loop of rope passing around pulley 46 which is freely rotatable on a pin 47. The cables 1 and 4 are also associated with a loop of rope 45 which passes around pulleys 48 freely rotatable on respective pins 49. The pins 47 and 49 are solid with a connecting box 50 to which is connected the drawing rope 51 via a rotary connection 52. The object of the rotary connection 52 is to avoid the transmission of any torsion accumulated in the drawing rope to the connection box 50. Similar rotatable connections 53 are provided for connecting the cables 1, 2 and 3, 4 to the respective loops 45 and 45' so as to prevent the transmission of torque accumulated in the cables to the box 50.

In order to stabilize the connecting box 50 it is also particularly useful to employ counterweights 54.

I claim:

1. A device for balancing the tension of at least two conductors, as they are fed out from feed drums, by means of a drawing rope, in the stringing operation of a high-voltage line, said device comprising connection means for connecting said drawing rope to said conductors; two braking drums each having at least a conductor passing thereover in frictional engagement therewith; a balanced hydraulic system comprising a pair of axles, each operatively connected to a corresponding drum; a differential unit having the output shafts each operatively connected to an axle of said pair of axles, and the input shaft operatively connected to a volumetric fluid pump; fluid conduit means for supplying fluid to, and receiving fluid from, said pump, said conduit means being adapted to brake the flow of said fluid to control the braking of said drums through said pump and said differential unit, this latter unit equalizing the braking force on said axles to maintain equal tension in said conductors.

2. A device according to claim 1, in which said fluid conduit means includes a main circuit with incompressible fluid; a nonreturn valve mounted in said circuit; a pilot valve for controlling the braking pressure of said fluid; and a heat exchanger mounted in said circuit for cooling said fluid.

3. A device according to claim 1, in which said conduit means further includes a secondary circuit; a blower for refrigerating the fluid circulating in the heat exchange, and means responsive to the pressure of the fluid flowing in said secondary circuit to actuate said blower.

4. The device of claim 1 as applied to the balancing of two pairs of said conductors, said connection means comprising a body means connected to said drawing rope, two loops of rope, each connected at its end to two cables of the same pair, at least one pulley associated with each loop, each pulley being freely mounted for rotation on said body means and engaging its associated loop, each said pulley enabling, through the action of the associated loop, an equal stretch two associated conductors when said drawing rope is pulled away from said feed drum; said differential unit comprising a balancing means for controlling the braking force and equally braking said drums to maintain equal tension between the first and second pairs of said conductors.

UNITED STATES PATENT OFFICE
CERTIFICATE OF CORRECTION

Patent No. 3,586,293            Dated June 22, 1971

Inventor(s) Walter BETTA

It is certified that error appears in the above-identified patent and that said Letters Patent are hereby corrected as shown below:

Column 4, (Claim 4), line 33, the line should read:

--the action of the associated loop, an equal stretch between the two as- --.

Signed and sealed this 9th day of November 1971.

(SEAL)
Attest:

EDWARD M. FLETCHER, JR.      ROBERT GOTTSCHALK
Attesting Officer               Acting Commissioner of Patents